United States Patent
Okabe

(10) Patent No.: US 6,270,930 B1
(45) Date of Patent: Aug. 7, 2001

(54) PRODUCTION APPARATUS AND PRODUCTION PROCESS FOR COLOR FILTER, AND LIQUID CRYSTAL DISPLAY DEVICE USING COLOR FILTER PRODUCED THEREBY

(75) Inventor: Tetsuo Okabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,808

(22) Filed: Jul. 27, 1999

(30) Foreign Application Priority Data

Jul. 30, 1998 (JP) .................................................. 10-215286

(51) Int. Cl.$^7$ .......................... G02B 5/20; G02F 1/1335; B41J 2/01
(52) U.S. Cl. .................................. 430/7; 347/1; 347/104; 349/106
(58) Field of Search .............................. 430/7; 347/104, 347/1; 349/106

(56) References Cited

U.S. PATENT DOCUMENTS 5,811,209 * 9/1998 Eida et al. ................................. 430/7

FOREIGN PATENT DOCUMENTS

| 409 596 | 1/1991 | (EP) . |
|---|---|---|
| 738 905 | 10/1996 | (EP) . |
| 59-075205 | 4/1984 | (JP) . |
| 63-235901 | 9/1988 | (JP) . |
| 63-294503 | 12/1988 | (JP) . |
| 1-217302 | 8/1989 | (JP) . |
| 5-105260 * | 4/1993 | (JP) . |

* cited by examiner

Primary Examiner—John A. McPherson
(74) Attorney, Agent, or Firm—Fitzpatrick, Cella, Harper & Scinto

(57) ABSTRACT

Disclosed herein is an apparatus for producing a color filter, comprising a substrate supporting stage, on which a substrate is mounted, and an ink-jet head for coloring a coloring region on the substrate, wherein an area of each non-contact portion present in the coloring region among non-contact portions, at which the substrate comes into no contact with the substrate supporting stage when the substrate is placed on the substrate supporting stage, is 9 mm$^2$ or less.

8 Claims, 7 Drawing Sheets

PRODUCTION APPARATUS AND PRODUCTION PROCESS FOR COLOR FILTER, AND LIQUID CRYSTAL DISPLAY DEVICE USING COLOR FILTER PRODUCED THEREBY

BACKGROUND OF THE INVENTION

1. Field of the Invention

The present invention relates to a production apparatus and a production process for a color filter, by which inks are applied to a transparent substrate using an ink-jet recording system to produce a color filter, and a liquid crystal display device using the color filter produced by this production process.

2. Related Background Art

An ink-jet recording system has heretofore been used as a recording method for printers as output means of information processing systems, for example, output terminals of copying machines, facsimiles, electronic typewriters, word processors, work stations, etc., or handy or portable printers which are installed in personal computers, host computers, optical disk devices, video devices, etc.

The ink-jet system is a system that an ink is applied to a portion to be colored from nozzles (also referred to as ejection orifices) to make a record of characters, images and/or the like, and has outstanding merits as a means for outputting high-definition images and conducting recording at high speed. A recording apparatus (ink-jet recording apparatus) using this method is an apparatus of the non-impact type and has such features that it causes little noise, color images can be formed with ease by using many inks of different colors, and the miniaturization of the body thereof and the provision of high-density images can also be achieved with ease, and has hence been being rapidly spread in recent years.

With the advancement of personal computers, particularly, portable personal computers in recent years, the demand for liquid crystal display devices, particularly, color liquid crystal display devices tends to increase. It is however necessary to reduce the cost of the color liquid crystal display devices for further spreading them. There is an increasing demand for reduction in the cost of color filters particularly given much weight from the viewpoint of the cost. Various methods have heretofore been attempted for meeting the above demand while satisfying properties required of the color filters. However, no method satisfying all the required properties is yet established. The individual methods will hereinafter be described.

A first method is a dyeing process. In the dyeing process, a water-soluble polymeric material, which is a material to be dyed, is applied to a glass substrate, and the coating film thus formed is patterned in the desired form by a photolithographic process. Thereafter, the substrate on which the coating film has been patterned is immersed in a dye bath to obtain a colored pattern. This process is repeatedly performed three times to produce a color filter layer composed of colored patterns of red (R), green (G) and blue (B).

A second method is a pigment dispersing process which has been oftenest used in recent years. In this process, a layer of a photosensitive resin, in which a pigment has been dispersed, is formed on a substrate and then subjected to patterning, thereby obtaining a pattern of a single color. This process is repeatedly performed three times, thereby producing a color filter layer composed of colored patterns of R, G and B.

As a third method, there is an electrodeposition process. In this process, a transparent electrode is patterned on a substrate. The substrate is then immersed in an electrodeposition coating fluid containing a pigment, a resin, an electrolytic solution and the like to electrically deposit a first color. This process is repeatedly performed three times, thereby forming colored patterns of R, G and B. Finally, the resin portions are thermoset, thereby forming a color filter layer.

A fourth method is a printing process in which pigments are separately dispersed in a thermosetting resin, the resultant thermosetting resin dispersions of R, G and B colors are separately applied to a substrate by repeating printing three times, and the resin portions are then thermally cured to form a color filter layer.

It is common to form a protective layer on the colored layer in each process.

The need of repeating the same process three times to form the three colored patterns of R, G and B is common to these processes. Therefore, the production cost is necessarily increased. There is also offered a problem that a yield is reduced as the number of processes increases. Further, in the electrodeposition process, formable patterns are limited. It is hence difficult to apply this process to an active matrix type (the so-called TFT type) color liquid crystal display device using TFT (thin film transistor) in the existing technique. Further, the printing process is poor in resolution and smoothness, and so fine-pitch patterns are difficult to form.

In order to cover up these faults, Japanese Patent Application Laid-Open No. 59-75205, 63-235901, 63-294503 or 1-217302 has proposed a process for producing a color filter using an ink-jet system. More specifically, it is described to provide a light-shielding film on a transparent substrate so as to have the prescribed regular apertures, and apply inks to the portions of the substrate corresponding to these apertures by the ink-jet system to form colored portions.

The production process for a color filter by the ink-jet system can reduce material cost because colored portions are formed only at necessary portions. In addition, the three colors can be applied at the same time, and so production process can be shortened, and the process is hard to be affected by dust. From such reasons that cost required for the production apparatus can be reduced, low material cost and high yield can be expected, so that it is possible to produce the color filter at lower cost compared with other production processes.

In the production apparatus of a color filter by the ink-jet system, a prescribed amount of each ink is applied at prescribed positions of a transparent substrate unlike the case of the general printer. Therefore, with respect to ink-droplet impact and color unevenness upon coloring, such a production apparatus is required to have precision higher by almost one order of magnitude than the case of the general printer.

Therefore, in the general printer of the ink-jet system, an ink is applied while conducting reciprocating scan of an ink-jet head, thereby making a record of an image, whereas the production apparatus of a color filter is so constructed that an ink-jet head is fixed to apply inks to a transparent substrate while scanning the transparent substrate in X-Y directions by reason of the precision required thereof. Such an apparatus is so constructed that the transparent substrate is sucked on a high-precision substrate chuck for the purpose of keeping a distance between the transparent substrate and the ink-jet head constant.

However, there has been a demand for development of an apparatus which can color a transparent substrate with still higher precision to prevent color unevenness.

SUMMARY OF THE INVENTION

It is an object of the present invention to provide a production apparatus and a production process for a color filter, by which a color filter free of any color unevenness can be produced with good efficiency.

Another object of the present invention is to provide a liquid crystal display device having excellent color display properties using the color filter produced by the above production process.

The above objects can be achieved by the present invention described below.

According to the present invention, there is thus provided an apparatus for producing a color filter, comprising a substrate supporting stage, on which a substrate is mounted, and an ink-jet head for coloring a coloring region on the substrate, wherein an area of each non-contact portion present in the coloring region among non-contact portions, at which the substrate comes into no contact with the substrate supporting stage when the substrate is placed on the substrate supporting stage, is 9 mm² or less.

According to the present invention, there is also provided a process for producing a color filter, comprising the steps of mounting a substrate on a substrate supporting stage, and coloring a coloring region on the substrate by an ink-jet system, wherein an area of each non-contact portion present in the coloring region among non-contact portions, at which the substrate comes into no contact with the substrate supporting stage when the substrate is placed on the substrate supporting stage, is 9 mm² or less.

According to the present invention, there is further provided a liquid crystal display device, comprising the color filter produced by the production process described above, an opposite substrate arranged in an opposing relation to the color filter, and a liquid crystal enclosed in a space between the color filter and the opposite substrate.

DESCRIPTION OF THE PREFERRED EMBODIMENTS

Figure 1A:
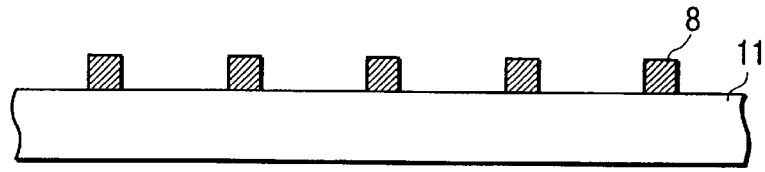
FIGS. 1A, 1B, 1C and 1D are flow charts illustrating an example of the production process of a color filter according to the present invention.
Figure 1B:
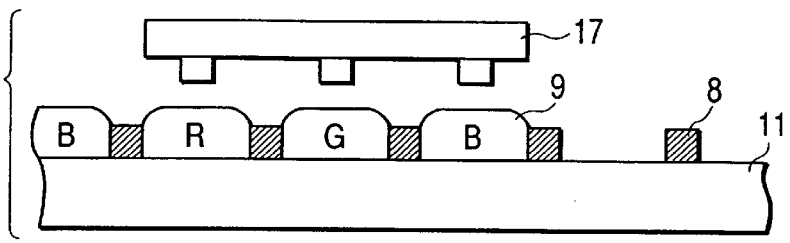
Figure 1C:
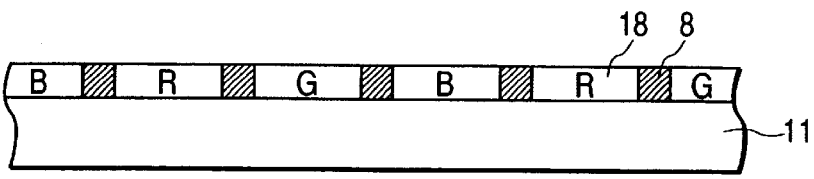
Figure 1D:
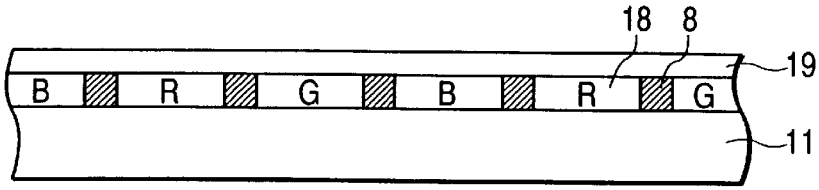
Figure 2A:
FIGS. 2A, 2B, 2C, 2D, 2E and 2F are flow charts illustrating another example of the production process of a color filter according to the present invention.
Figure 2B:
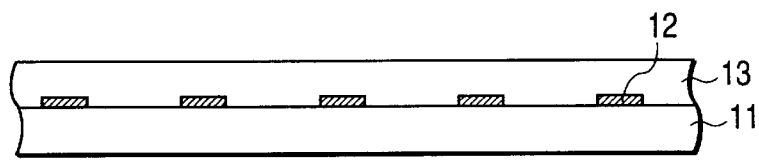
Figure 2C:
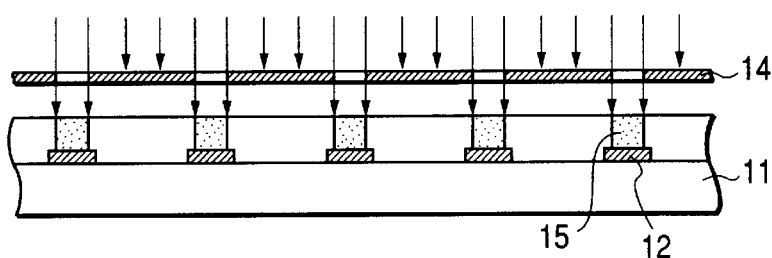
Figure 2D:
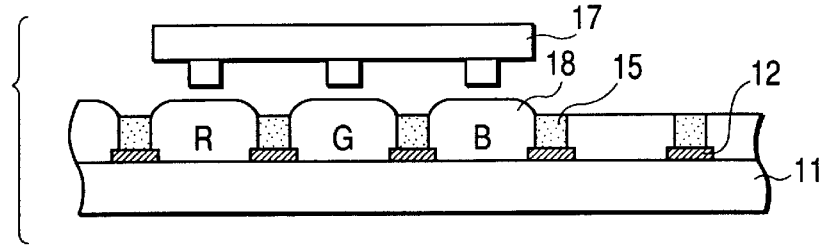
Figure 2E:
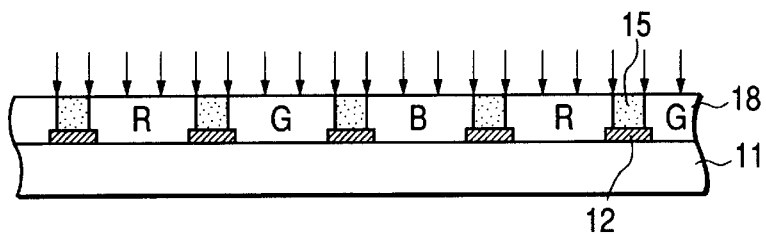
Figure 2F:
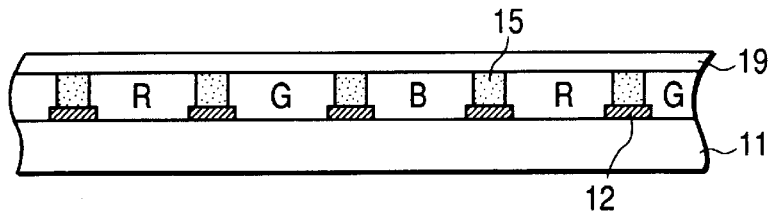

The present inventors have found that a cause of color unevenness in a color filter produced by an ink-jet system resides in the structure of a substrate supporting stage that holds a substrate in a production apparatus, thus leading to the completion of the present invention.

A process for producing a color filter using a production apparatus according to the present invention will be first described. The production process of a color filter according to the present invention is roughly divided into 2 processes. One of these processes is a process comprising forming black matrices composed of a black resin or the like on a transparent substrate, and applying inks each comprising a resin component and a colorant to portions of the substrate corresponding to apertures defined by the black matrices by an ink-jet recording apparatus, thereby forming color portions. The other is a process comprising forming a layer of a resin composition, the ink absorbency of which is lowered or enhanced by light irradiation or light irradiation and heat treatment, on a transparent substrate, subjecting the resin composition layer to patterning exposure, thereby forming portions high in ink absorbency and portions low in ink absorbency, and applying inks to the portions to be colored (portions high in ink absorbency) by an ink-jet recording apparatus, thereby coloring such portions to form colored portions. The individual steps of both processes will be described by reference to FIGS. 1A through 1D, and FIGS. 2A through 2F, respectively.

FIGS. 1A through 1D correspond to the following Steps A through D, respectively. In the drawings, reference numeral 11 indicates a transparent substrate, 8 black matrices, 9 inks, 17 an ink-jet recording apparatus, 18 colored portions, and 19 a protective layer.

[Step A]

Partition walls are formed on a substrate 11. The partition walls are members for preventing color mixing between adjacent inks of different colors upon the application of inks in Step B which will be described subsequently. In Steps 1A through 1D, the partition walls are formed as black matrices 8 serving also as light-shielding layer portions. The black matrices 8 are formed by patterning according to general photolithography using, preferably, a black pigment-containing resist. Ink repellency has preferably been imparted to the black matrices 8 in advance for the purpose of enhancing the effect of preventing the color mixing. The thickness of the black matrices is preferably at least 0.5 μm in view of the action of preventing color mixing as the partition wall and light-shielding action.

[Step B]

Respective inks 9 of red (R), green (G) and blue (B) colors are applied to the substrate using an ink-jet recording apparatus 17 in such a manner that the recessed parts defined by the black matrices are filled. The inks used in this step are preferably resin compositions comprising respective colorants and a resin curable by applying energy thereto, since the inks are directly cured to form colored portions.

As the colorants, direct dyes, acid dyes, reactive dyes, disperse dyes, oil-soluble dyes or the like may preferably used.

As the resin curable by applying energy, is preferred a resin curable by, for example, heat, light or a combination of heat and light. Specifically, as a thermosetting resin, a combination of any known resin and a crosslinking agent may be used. Examples thereof include melamine resins, a hydroxyl group-or carboxyl group-containing polymer and melamine, a hydroxyl group-or carboxyl group-containing polymer and a polyfunctional epoxy compound, a hydroxyl group-or carboxyl group-containing polymer and a reactive cellulose compound, an epoxy resin and a resol resin, an epoxy resin and an amine, an epoxy resin and a carboxylic acid or an acid anhydride, and epoxy compounds. As a photosetting resin, any known photo-curing resin, for example, a commercially available negative resist may preferably be used.

Various kinds of solvents may be used in the above-described inks. A mixed solvent of water and at least one water-soluble organic solvent is particularly preferably used from the viewpoint of ejectability in the case where the inks are used in the ink-jet system.

Further, the inks may contain, in addition to the above-described components, surfactants, antifoaming agents, antiseptics and the like as needed to provide them as inks having desired properties. Commercially-available water-soluble dyes and/or the like may also be added thereto.

[Step C]

The inks 9 applied through apertures defined by black matrices 8 are subjected to a necessary treatment such as light irradiation or heat treatment through an optional drying step to cure the inks, thereby forming colored portions 18.

[Step D]

A protective layer 19 is formed on the colored portions 18 as needed. As the protective layer 19, may be used a layer of a resin composition of the photo-curing type or thermo-setting type or the type curable by a combination of heat and light, or an inorganic film formed by vapor deposition, sputtering or the like. In any case, any layer or film may be used so far as it has sufficient transparency for color filter and can withstands subsequent ITO-forming process, oriented-film forming process and the like.

FIGS. 2A through 2F are flow charts illustrating a case where an ink-receiving layer of the type that a resin composition forming the ink-receiving layer is cured by light irradiation to lower its ink absorbency is used. FIGS. 2A through 2F correspond to the following Steps A to F, respectively. In the drawings, reference numeral 11 indicates a transparent substrate, 12 black matrices, 13 an ink-receiving layer, 14 a photomask, 15 uncolored portions, 17 an ink-jet recording apparatus, 18 colored portions, and 19 a protective layer.

[Step A]

The black matrices 12 are formed on the substrate 11. In the present invention, a glass substrate is generally used as the substrate 11. However, the substrate is not limited to the glass substrate, and any substrate may be used so far as it has properties required of the color filter, such as transparency and mechanical strength.

In FIGS. 2A through 2F, the black matrices 12 are formed on the substrate 11. However, the black matrices 12 may be formed on the ink-receiving layer 13 after forming the ink-receiving layer 13, which will be described subsequently, or coloring the ink-receiving layer 13. As a process for forming them, it is general to form a thin metal film by sputtering or vapor deposition and subject the thin metal film to patterning by a photolithographic process. However, the forming process is not limited thereto.

[Step B]

A resin composition, which is cured by light irradiation or light irradiation and heat treatment to lower its ink absorbency at light-exposed portions thereof, is applied to the substrate 11 and prebaked as needed, thereby forming the ink-receiving layer 13. As a base resin of such a resin composition, is used an acrylic, epoxy or amide resin. However, the base resin is not particularly limited thereto. A photo-initiator (crosslinking agent) may be used in such a resin for facilitating a crosslinking reaction by light or a combination of light and heat. As the photo-initiator, may be used a dichromate, bisazide compound, radical initiator, cationic initiator, anionic initiator or the like. Incidentally, a heat treatment may be conducted after the light irradiation for the purpose of facilitating the crosslinking reaction.

The ink-receiving layer can be formed by using a coating process such as spin coating, roll coating, bar coating, spray coating or dip coating. However, the coating process is not particularly limited thereto.

[Step C]

Portions of the resin composition layer on the black matrices 12 are subjected to patterning exposure by means of the photomask 14 to cure the portions, thereby lowing the ink absorbency thereof to form the uncolored portions 15. By forming the uncolored portions 15 having low ink absorbency in the ink-receiving layer 13, color mixing between adjacent colored portions can be prevented.

[Step D]

Inks of R, G and B colors are applied to portions of the ink-receiving layer 13 defined by the uncolored portions 15 according to the prescribed coloring pattern by means of the ink-jet recording apparatus 17, thereby forming the colored portions 18. As the inks used in the coloring, both dye inks and pigment inks may be used. Both liquid inks and solid inks may also be used. When water-based inks are used, it is preferred to form the ink-receiving layer 13 with a resin composition having high water absorbency. As the ink-jet system, a bubble-jet type using an electrothermal converter as an energy-generating element, a piezo-jet type making use of a piezoelectric element or the like may be used. A coloring area and a coloring pattern may be optionally preset.

[Step E]

After the inks are dried as needed, the whole surface of the substrate is exposed to light to cure the colored portions 18. A heat treatment may be conducted in place of the light irradiation (exposure).

[Step F]

The protective layer 19 is formed as needed. As the protective layer, may be used a resin layer capable of cured by light, heat or a combination of light and heat, or an inorganic film formed by vapor deposition or sputtering. However, any layer or film may be used so far as it has sufficient transparency to be used in a color filter and withstands subsequent ITO-forming process, oriented-film forming process and the like.

The example where the resin composition of the type that the ink absorbency thereof is lowered by light irradiation was used in the ink-receiving layer has been shown in FIGS. 2A through 2F. When a resin composition of the type that the ink absorbency thereof is enhanced by light irradiation or light irradiation and heat treatment is used, this resin composition is preferably of a system making good use of a reaction by chemical amplification. Examples of such a resin include products obtained by esterifying hydroxyl groups of cellulose derivatives such as hydroxypropyl cellulose and hydroxyethyl cellulose, or blocking them with an acetyl group or the like (for example, compounds of the cellulose acetate type); products obtained by esterifying hydroxyl groups of polymeric alcohols such as polyvinyl alcohol, and derivatives thereof, or blocking them with an acetyl group or the like (for example, compounds of the polyvinyl acetate type); and products obtained by blocking hydroxyl groups of novolak resin such as cresol novolak, and poly(p-hydroxystyrene) and derivatives thereof with, for example, a trimethyl-silyl group. When such a resin composition is used, the black matrices may be used as a photomask to conduct patterning exposure from the back side of the transparent substrate, thereby enhancing the ink absorbency of the exposed portions to form the colored portions.

Figure 3:
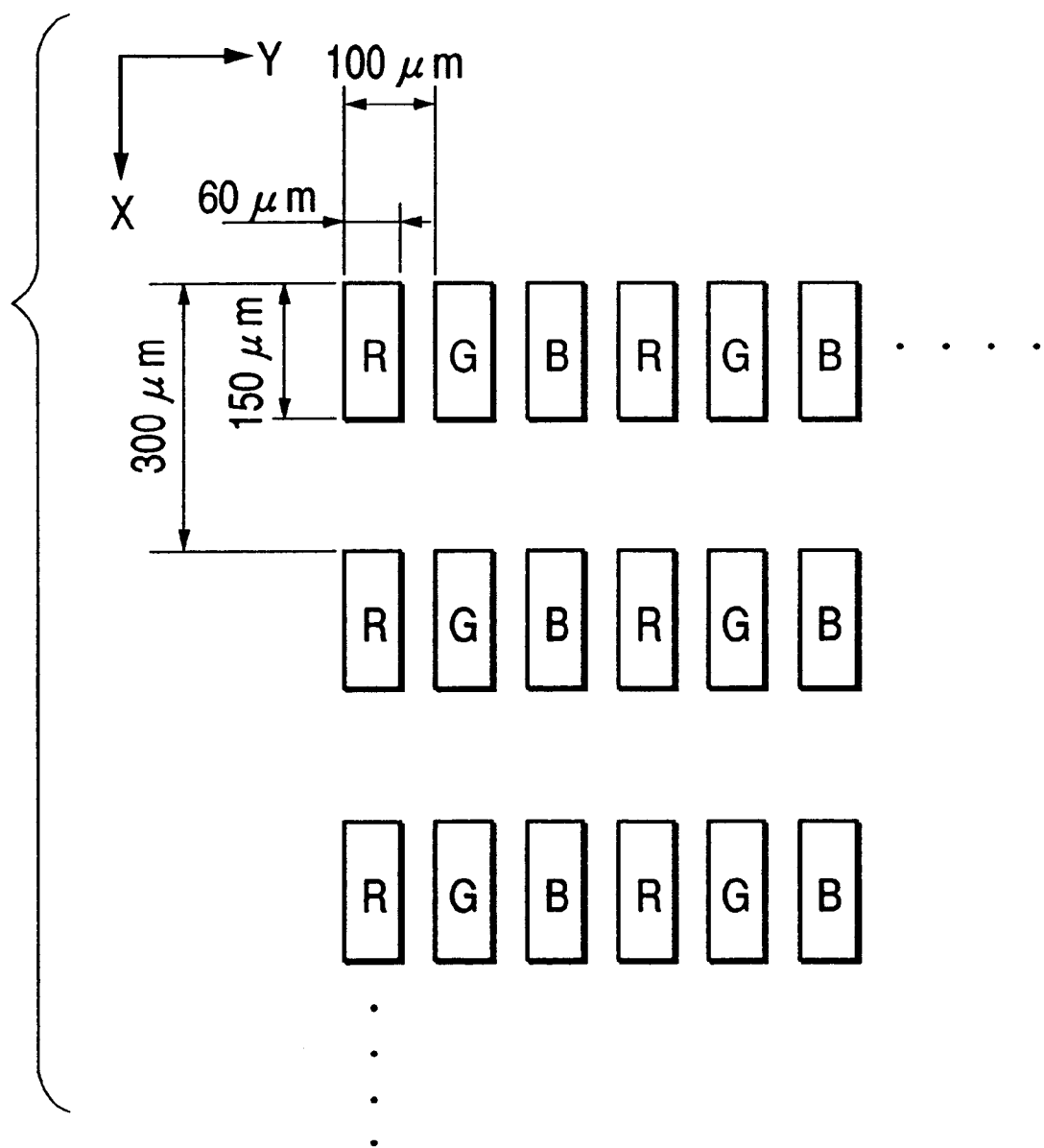
FIG. 3 illustrates an arrangement example of colored portions in a color filter according to the present invention.

An example of the arrangement of colored portions in a color filter according to the present invention is shown in FIG. 3. Each of the colored portions respectively colored with inks of R (red), G (green) and B (blue) colors is a filter element and almost rectangular. Supposing that the longitudinal direction of one pixel is an X direction, and a direction perpendicular to the X direction is a Y direction, the sizes of the filter elements are all the same and in a size of, for example, 150 $\mu$m×60 $\mu$m. A pitch in the X direction is 300 $\mu$m, and a pitch in the Y direction is 100 $\mu$m. The respective filter elements are arranged in such a manner that filter elements of the same color are arranged in a row in the X direction, and the colors of adjacent filter elements arranged in the Y direction are different from each other. The number of the filter elements are, for example, 480 in the X direction and 1920 in the Y direction (640 elements for each color) so as to correspond to a 9.4 inch-sized liquid crystal display panel having a faceplate size of 144 mm×192 mm and a length of a diagonal line of 240 mm. Incidentally, the color filter according to the present invention is not limited to the above-described arrangement and size.

Figure 4:
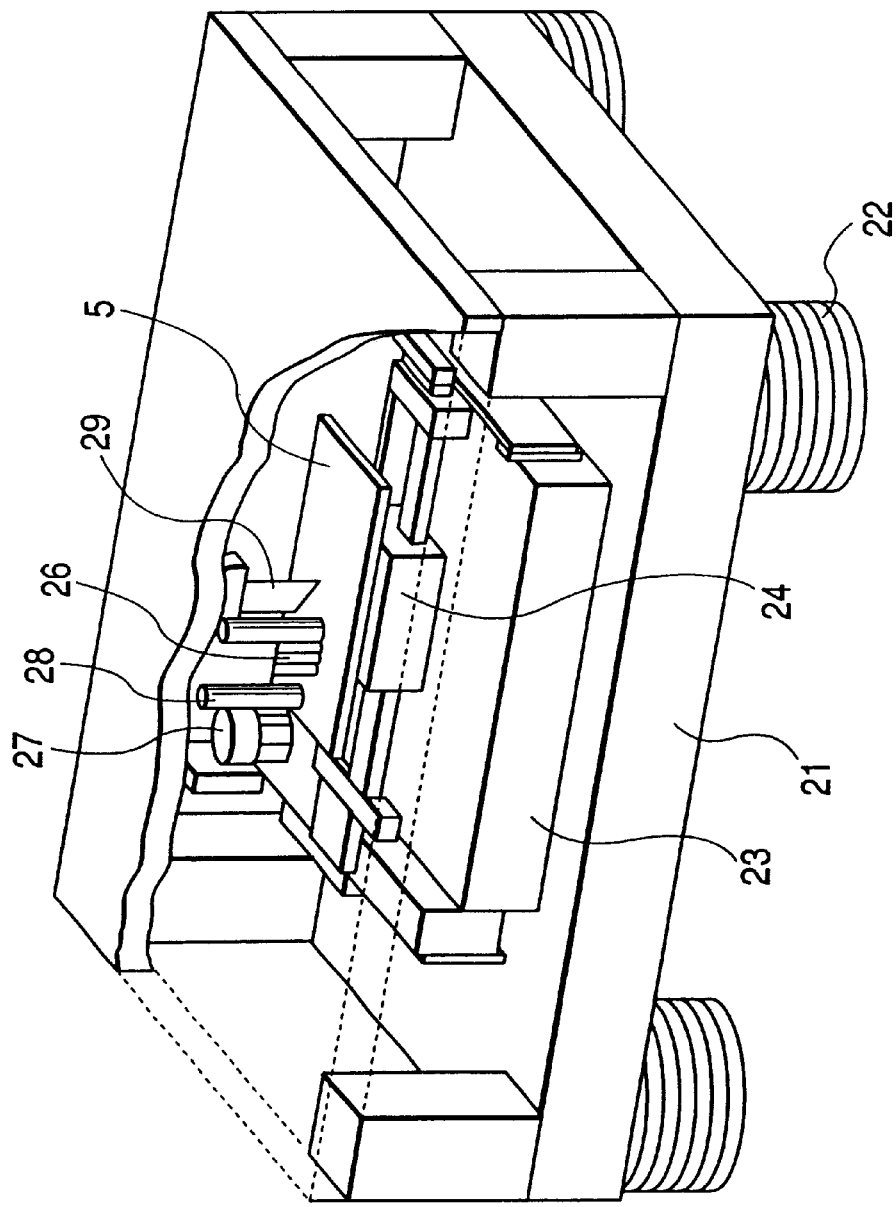
FIG. 4 is a perspective view illustrating an example of the production apparatus of a color filter according to the present invention.

The whole construction of a production apparatus of a color filter according to the present invention, by which the above-described production processes of a color filter are carried out, is illustrated in FIG. 4. In the drawing, reference numeral 21 indicates a surface plate for installing the apparatus, 22 vibration-damping stands for supporting the surface plate 21 and interrupting external vibrations, 23 an X-Y stage provided on the surface plate 21 and moving with a long stroke, 24 a θ-Z-tilt stage for θ-Z-tilt alignment mounted on the X-Y stage 23, 5 a transparent substrate placed on the θ-Z-tilt stage 24, 26 an ink-jet head, 27 an optical system for detecting the alignment of the transparent substrate 5 in the X-Y-θ directions, 28 an optical system for detecting Z, and 29 an optical system for detecting the impact position of an ink applied by the ink-jet head 26.

In the above-described construction, a dummy substrate is mounted upon the assembly of the apparatus, or the like to write a pattern for evaluation by the alignment-detecting system 27. The X-Y stage 23 is moved to determine the impact position by the impact position-detecting system 29. These processes permit the precise determination of the coordinates of the alignment-detecting system 27 and the coordinates of the impact position of the ink-jet head 26. These coordinate data do not vary even when another substrate is mounted. Therefore, it is only necessary to conduct this determination at the time system parameters change upon the assembly of the apparatus, an exchange of the ink-jet head, or the like. The impact position may be determined by another apparatus so as to reproduce this data in the production apparatus of a color filter.

Figure 5:
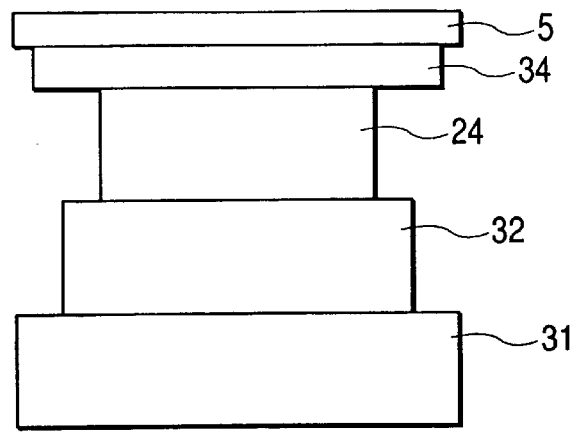
FIG. 5 illustrates an example where a transparent substrate is supported in the production apparatus of a color filter according to the present invention.

FIG. 5 illustrates the state that a transparent substrate 5 has been mounted on a stage. FIG. 5 is an enlarged view about the circumference of the transparent substrate 5 in FIG. 4. Reference numeral 31 indicates a Y stage moving with a large stroke, 32 an X stage moving with a great stroke, and 34 a substrate supporting stage for supporting the transparent substrate 5. The substrate supporting stage 34 is formed with a material such as aluminum or ceramic.

Figure 6:
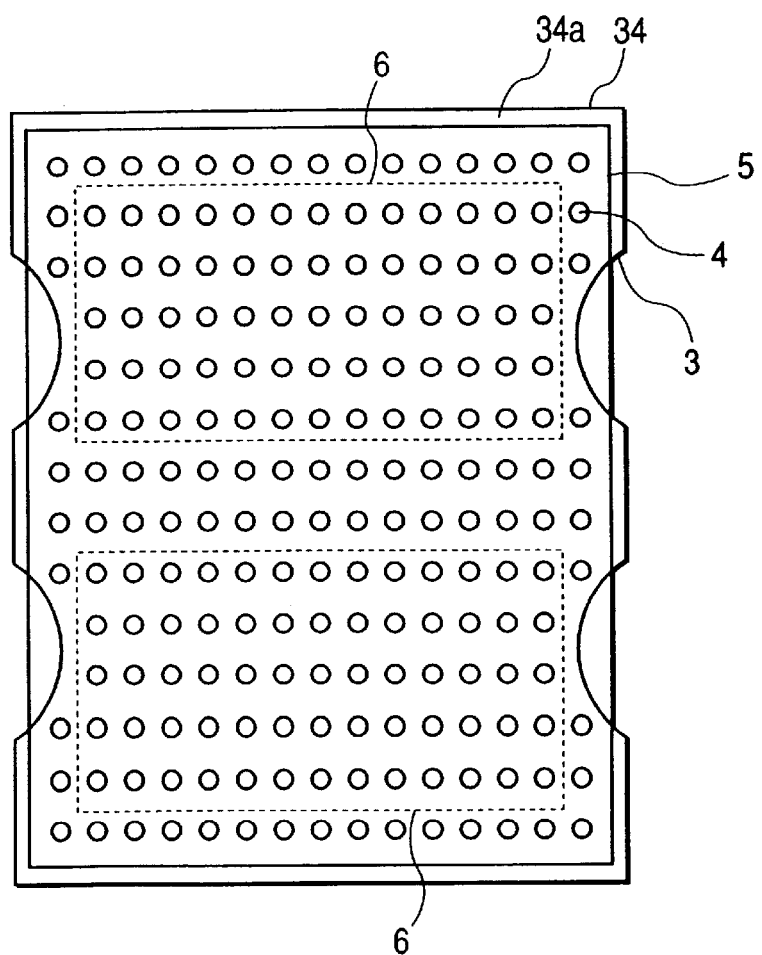
FIG. 6 is a plan view illustrating an example of a substrate supporting stage used in the production apparatus of a color filter according to the present invention in a state that a transparent substrate has been mounted thereon.

As illustrated in FIG. 6, a plurality of suction holes 4 is made in a supporting surface 34a of the substrate supporting stage 34. The transparent substrate 5 placed on the supporting surface 34a can be fixed without fail by sucking air from the suction holes 4. The transparent substrate 5 is placed on the supporting surface 34a by a hand equipped with a vertically driving mechanism (not illustrated), or transferred to another place. Cutouts 3 are formed in the substrate supporting stage 34 in order that the substrate supporting stage should not interfere with the hand when the hand transfers the transparent substrate 5.

Regions 6 indicated by a broken line are coloring regions in which the colored portions of the color filter will be formed. In an example illustrated in FIG. 6, two color filters are finally taken out of the transparent substrate 5.

Figure 7:
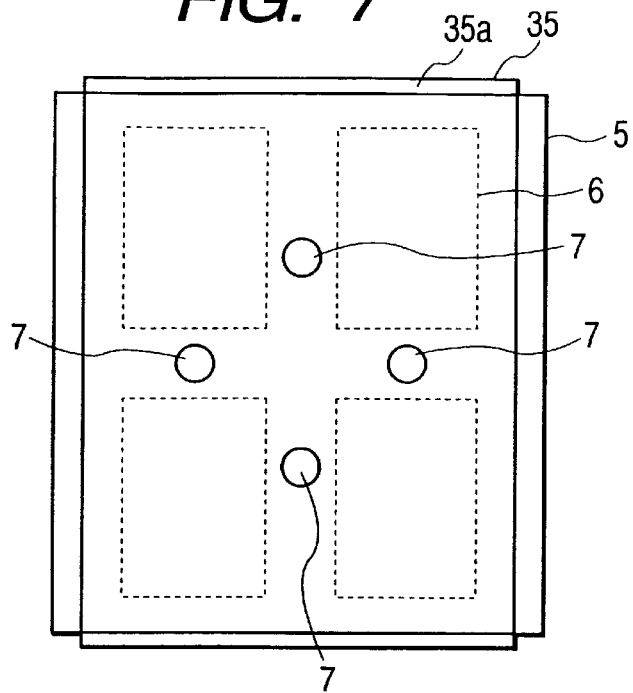
FIG. 7 is a plan view illustrating another example of a substrate supporting stage used in the production apparatus of a color filter according to the present invention in a state that a transparent substrate has been mounted thereon.

As illustrated in FIG. 7, holes 7 for a lifting pin may be provided in a substrate supporting stage 35 so as to project the lifting pin (not illustrated) through each of the holes 7. The transparent substrate 5 can be separated from a supporting surface 35a by projecting the lifting pins from the respective holes and grasped by the hand. Suction holes made in the substrate supporting stage 35 are omitted in FIG. 7.

The corresponding portions to the suction holes 4, cutouts 3 or holes 7 for lifting pin will become non-contact portions which come into no contact with the transparent substrate 5 when the transparent substrate 5 is placed on the substrate supporting stage. When the area of the non-contact portions within the coloring region was large color densities differed between portions, at which the transparent substrate 5 comes into contact with the substrate supporting stage 35, and the non-contact portions, so that color unevenness occurred. As the result of having made an investigation with the area of one non-contact portion variously changed, it has been found that when an area of a non-contact portion is 9 mm$^2$ or less, the occurrence of color unevenness can be prevented.

Although the cause of the color unevenness is not clearly known, it seems that since heat is hard to escape in the non-contact portions, while heat is easy to escape in the portions, at which the transparent substrate 5 comes into contact with the substrate supporting stage 35, a difference arises in diffusion of colorants on the substrate 5.

A preferable area of a non-contact portion within the coloring region is 7.1 mm$^2$ or less. If an area of each suction hole is too small, it is impossible to firmly fix the substrate to the substrate supporting stage. Therefore, an area of one suction hole is preferably 0.03 mm$^2$ or larger. The irregular arrangement of the suction holes is better than the regular arrangement thereof. When the movement of the substrate supporting stage is slow, it is also possible to use a substrate supporting stage free of any suction hole.

Figure 8:
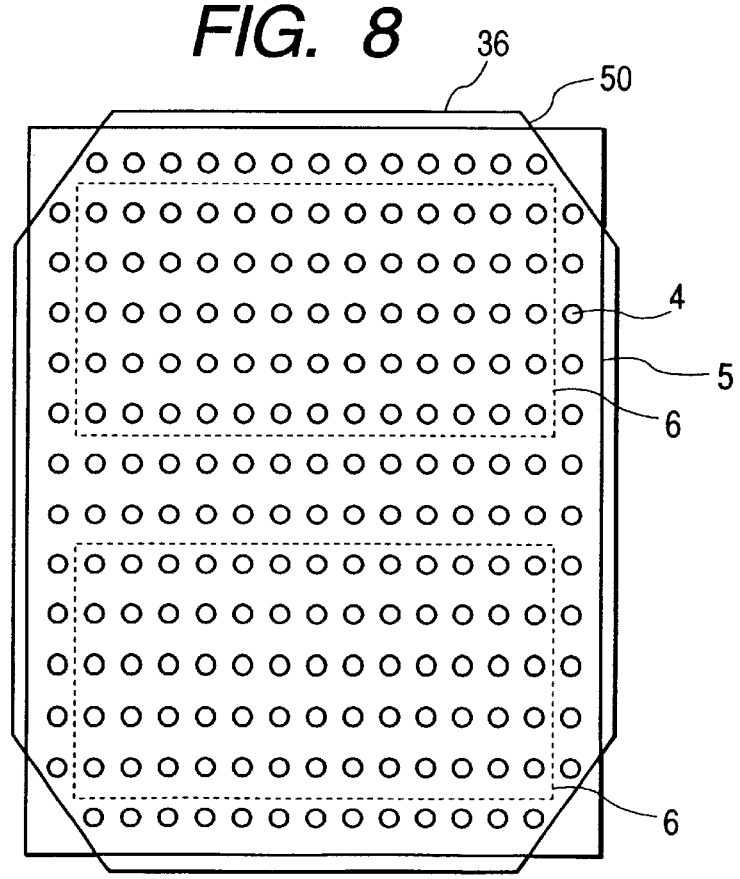
FIG. 8 is a plan view illustrating a further example of a substrate supporting stage used in the production apparatus of a color filter according to the present invention in a state that a transparent substrate has been mounted thereon.

In a substrate supporting stage 36 illustrated in FIG. 8, cutouts 50 are formed at four corners thereof for the purpose of avoiding the interference with the hand for transferring the substrate. The cutouts 50 are formed so at to be located outside the coloring regions 6.

Figure 9:
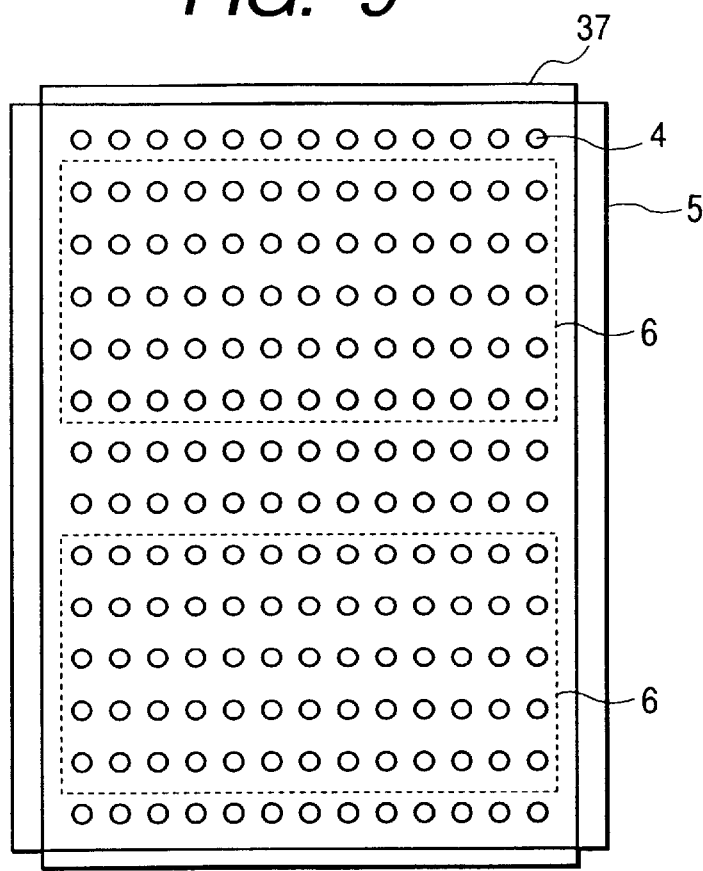
FIG. 9 is a plan view illustrating a still further example of a substrate supporting stage used in the production apparatus of a color filter according to the present invention in a state that a transparent substrate has been mounted thereon.

A substrate supporting stage 37 illustrated in FIG. 9 is formed in such a manner that its width is somewhat smaller than that of the transparent substrate 5, so that the transparent substrate 5 is carried in or out by the hand making use of portions of the substrate projecting from the substrate supporting stage 37. This construction saves the necessity of forming the cutouts.

Figure 10:
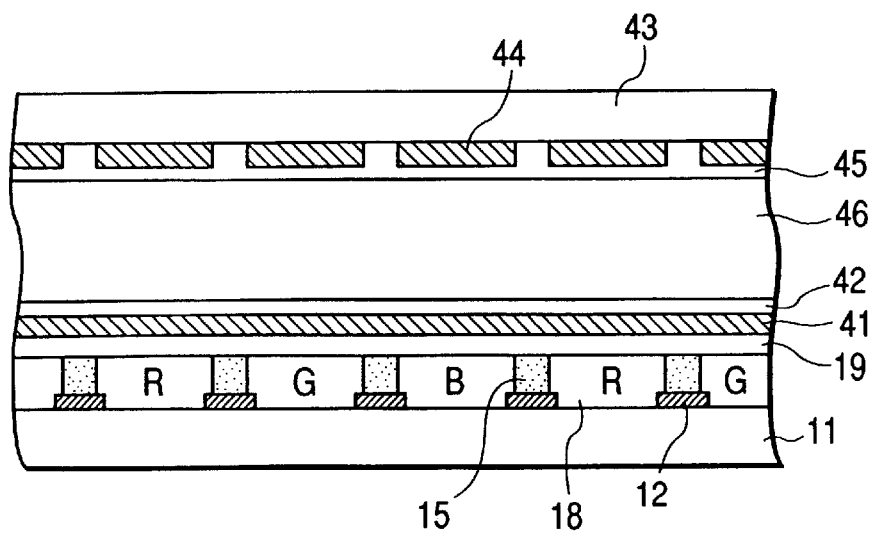
FIG. 10 is a cross-sectional view illustrating an example of a liquid crystal display device using the color filter produced by the production process of a color filter according to the present invention.

With reference to FIG. 10, an active matrix type liquid crystal display device using a color filter produced by means of the production apparatus of a color filter according to the present invention will now be described. In FIG. 10, reference numeral 41 designate a common electrode, 42 an oriented film, 43 a substrate, 44 pixel electrodes, 45 an oriented film, and 46 a liquid crystal compound.

The color liquid crystal display device is generally formed by uniting a substrate 11 on the side of the color filter and the TFT substrate 43 opposite thereto and enclosing the liquid crystal compound 46 in a space between them. On the inside of the opposite substrate 43 of the liquid crystal display device, TFT (not illustrated) and the transparent pixel electrodes 44 are formed in the form of a matrix. On the inside of the other substrate 11, a color filter layer is provided in such a manner that colored portions 18 of R, G and B colors are arranged at the positions opposite to the pixel electrodes 44. The transparent common electrode 41 is formed over the whole surface of the color filter layer. Black matrices 12 are generally formed on the side of the color filter substrate, but formed on the side of the TFT substrate in a liquid crystal display device of the BM-on-array type. The oriented films 42 and 45 are further formed on the respective insides of both substrates. Liquid crystal molecules can be oriented in a fixed direction by subjecting these films to a rubbing treatment.

Polarizing plates (not illustrated) are bonded to the outer surfaces of the respective substrates 11, 43. The liquid crystal compound is caused to function as an optical shutter for changing the transmittance of light from a back light generally composed of a combination of a fluorescent lamp and a scattering plate (both, not illustrated), thereby making a display.

According to the production apparatus of a color filter according to the present invention, a color filter free of any color unevenness can be produced with good efficiency by an ink-jet system.

The production apparatus of a color filter according to the present invention will hereinafter be described more specifically by the following examples.

EXAMPLE 1

A resin composition comprising 97 parts by weight of an acrylic terpolymer having the following composition:

| | |
|---|---|
| methyl methacrylate | 50 parts by weight |
| hydroxyethyl methacrylate | 30 parts by weight |
| N-methylolacrylamide | 20 parts by weight | and 3 parts by weight of triphenylsulfonium hexafluoroantimonate dissolved in ethyl cellosolve was applied onto a glass substrate (1737, trade name, product of Corning Co.), on which black matrices composed of chromium had been formed, by spin coating so as to give a film thickness of 1 $\mu$m, and then prebaked at 90° C. for 20 minutes, thereby forming an ink-receiving layer.

The ink-receiving layer (resin layer) was subjected to patterning exposure in the form of stripe at portions of the resin layer corresponding to the black matrices through a photomask having stripe-like openings each having a width smaller than that of each black matrix, and then subjected to a heat treatment for 1 minute on a hot plate heated to 120° C. Dye inks of R, G and B colors were applied to unexposed portions of the resin layer by means of the production apparatus of a color filter illustrated in FIG. 4, thereby coloring the ink-receiving layer in the form of stripe.

That illustrated in FIG. 9 was used as a substrate supporting stage. Suction holes each had a diameter of 3 mm (area: 7.1 mm$^2$) and were arranged in such a manner that the distance of the center between adjacent holes was almost 20 mm. The transparent substrate was placed on the substrate supporting stage in such a manner that it projected by each 20 mm from both sides of the substrate supporting stage.

After the coloring, the substrate was left to stand for 10 minutes, and the inks were dried at 90° C. for 10 minutes. The substrates thus colored was subsequently subjected to a heat treatment at 230° C. for 30 minutes to cure the ink-receiving layer.

The colored state of the color filter thus produced was visually observed. As a result, it was found to be good without any color unevenness.

EXAMPLE 2

A black resist (product of Nippon Steel Chemical Co., Ltd.) was applied onto a glass substrate (1737, trade name, product of Corning Co.) and subjected to the prescribed exposure and development, thereby preparing a substrate having black matrices in the form of lattice.

An acrylic terpolymer having the following composition:

| | |
|---|---|
| methyl methacrylate | 50 parts by weight |
| hydroxyethyl methacrylate | 30 parts by weight |
| N-methylolacrylamide | 20 parts by weight | was used as a thermosetting component, and inks of R, G and B colors were prepared in accordance with the following respective formulations:

| | |
|---|---|
| C.I. Acid Orange 148 | 3.5 parts by weight |
| C.I. Acid Red 289 | 0.5 parts by weight |
| Diethylene glycol | 30 parts by weight |
| Isopropyl alcohol | 20 parts by weight |
| Ion-exchanged water | 40 parts by weight |
| Thermosetting component described above | 6 parts by weight. |
| G ink: | |
| C.I. Acid Yellow 23 | 2 parts by weight |
| Zinc phthalocyanine sulfamide | 2 parts by weight |
| Diethylene glycol | 30 parts by weight |
| Isopropyl alcohol | 20 parts by weight |
| Ion-exchanged water | 40 parts by weight |
| Thermosetting component described above | 6 parts by weight. |
| B ink: | |
| C.I. Direct Blue 199 | 4 parts by weight |
| Diethylene glycol | 30 parts by weight |
| Isopropyl alcohol | 20 parts by weight |
| Ion-exchanged water | 40 parts by weight |
| Thermosetting component described above | 6 parts by weight. |

The respective inks were applied to portions of the substrates corresponding to apertures defined by the black matrices by means of the same production apparatus as that used in EXAMPLE 1. The substrate was then left to stand for 10 minutes, and the inks were dried at 90° C. for 10 minutes. The substrates thus colored was subsequently subjected to a heat treatment at 230° C. for 30 minutes to set the inks.

The colored state of the color filter thus produced was visually observed. As a result, it was found to be good without any color unevenness.

COMPARATIVE EXAMPLE

A color filter was produced in the same manner as in EXAMPLE 1 except that the substrate supporting stage used in EXAMPLE 1 was changed to a substrate supporting stage having suction holes each having a diameter of 5 mm (area: 19.6 mm$^2$).

The colored state of the color filter thus produced was visually observed. As a result, the color filter was found to undergo color unevenness.

What is claimed is:

1. An apparatus for producing a color filter comprising: a substrate supporting stage on which a substrate is mounted and an ink-jet head for coloring a coloring region on the substrate, wherein an area of each non-contact portion present in the coloring region among non-contact portions, at which the substrate does not contact the substrate supporting stage when the substrate is placed on the substrate supporting stage, is 9 mm$^2$ or less, and cutouts are included in the substrate supporting stage.

2. An apparatus for producing a color filter comprising: a substrate supporting stage on which a substrate is mounted and an ink-jet head for coloring a coloring region on the substrate, wherein an area of each non-contact portion present in the coloring region among non-contact portions, at which the substrate does not contact the substrate supporting stage when the substrate is placed on the substrate supporting stage, is 9 mm$^2$ or less, and wherein the width of the substrate supporting stage is smaller than that of the substrate.

3. The production apparatus according to claim 1 or 2, wherein the area of said each non-contact portion is 7.1 mm$^2$ or less.

4. The production apparatus according to claim 1 or 2, wherein suction holes are included in the substrate supporting stage.

5. A process for producing a color filter comprising the steps of: mounting a substrate having black matrices which define apertures on a substrate supporting stage, and coloring said apertures by an ink-jet system, wherein an area of each non-contact portion present in the coloring region among non-contact portions, at which the substrate does not contact the substrate supporting stage when the substrate is placed on the substrate supporting stage, is in the range of 0.03 to 9 mm$^2$.

6. A process for producing a color filter comprising the steps of: mounting a substrate having black matrices and an ink-receiving layer on a substrate supporting stage, and coloring a coloring region of the ink-receiving layer by an ink-jet system, wherein an area of each non-contact portion present in the coloring region among non-contact portions, at which the substrate does not contact the substrate supporting stage when the substrate is placed on the substrate supporting stage, is in the range of 0.03 to 9 mm$^2$.

7. The production process according to claim 5 or 6, wherein the area of said each non-contact portion is 7.1 mm$^2$ or less.

8. A liquid crystal display device comprising: the color filter produced by the production process according to claim 5 or 6, an opposite substrate arranged in an opposing relation to the color filter and a liquid crystal enclosed in a space between the color filter and the opposite substrate.

* * * * *